United States Patent [19]

Tinz

[11] Patent Number: 4,460,946
[45] Date of Patent: Jul. 17, 1984

[54] REFLECTOR ARRANGEMENT FOR PHOTO-TECHNICAL AND PHOTOGRAPHIC PURPOSE

[75] Inventor: Bernhard H. Tinz, Stuttgart, Fed. Rep. of Germany

[73] Assignee: Lunos Lüftung GmbH & Co. Ventilatoren KG, Berlin, Fed. Rep. of Germany

[21] Appl. No.: 351,783

[22] Filed: Feb. 24, 1982

[30] Foreign Application Priority Data

Mar. 6, 1981 [EP] European Pat. Off. ........ 81101611.2

[51] Int. Cl.³ .............................................. F21V 17/02
[52] U.S. Cl. ...................................... 362/319; 362/16; 362/17; 362/18; 362/322; 362/341; 362/346; 362/347; 362/449; 362/450; 362/396
[58] Field of Search ................... 362/16, 17, 18, 319, 362/322, 341, 346, 347, 449, 450, 396

[56] References Cited

U.S. PATENT DOCUMENTS 2,968,033  1/1961  Kreitzberg ..................... 362/346
3,852,582  12/1974  Lowell .............................. 362/17

Primary Examiner—Stephen J. Lechert, Jr.
Attorney, Agent, or Firm—Birch, Stewart, Kolasch & Birch

[57] ABSTRACT

The reflector arrangement consists of a several plate-shaped elements (12) having abutting edges and being placed to meet in one plane. The plate-shaped elements (12) are held together by a mounting (10) the front plate (13) of which partly covers the elements (12). The front surface of plate (13) is also reflective. A clamping rail (15) is secured to the plate (13) via a clamping hinge. The reflector arrangement can be used in connection with one of the plate-shaped elements (12) or with four plate-shaped elements (12) in total, but it can be also utilized only with the use of the front plate (13) of the mounting (10) as a reflector and without the plate-shaped elements (12). The elements (12) can be piled thus permitting to fold the reflector screen (11) without the formation of creases or breaks.

9 Claims, 11 Drawing Figures

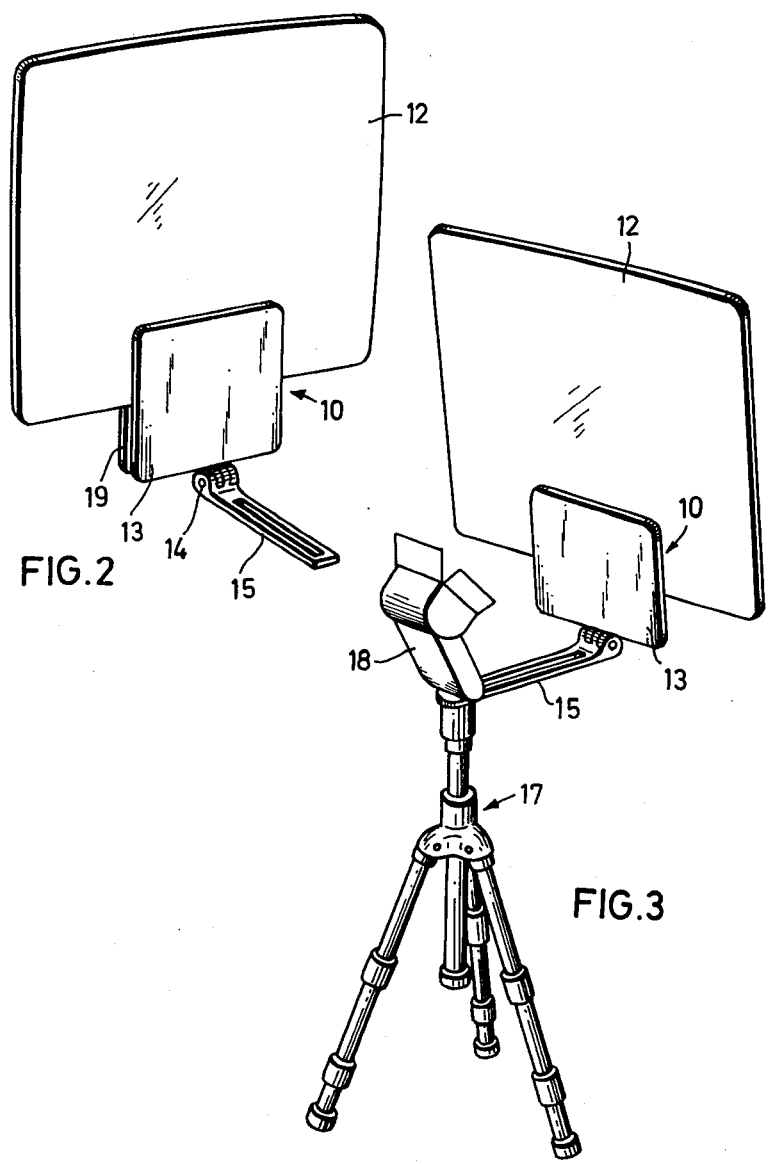

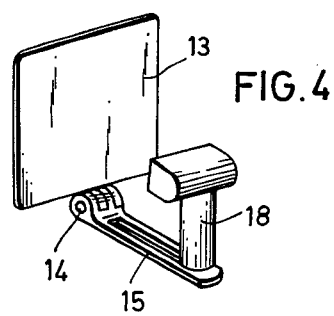
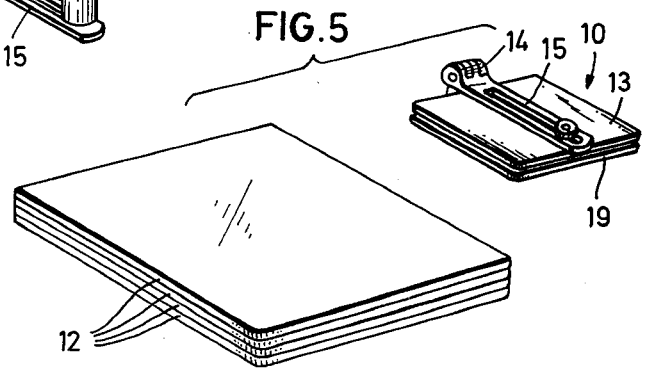
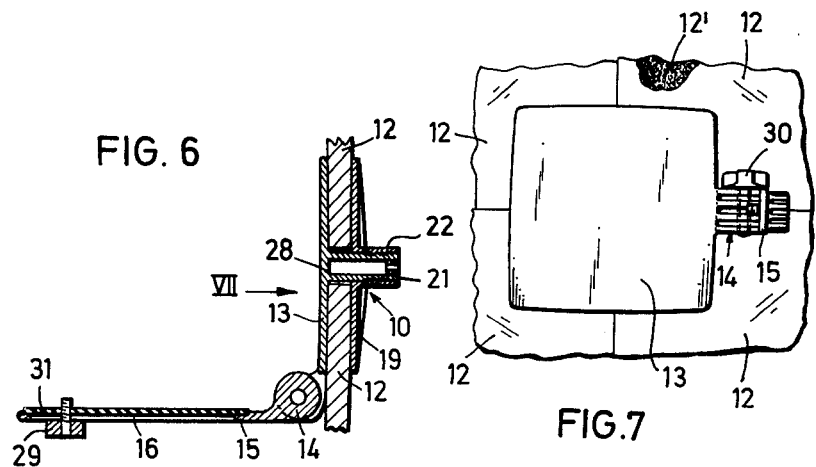

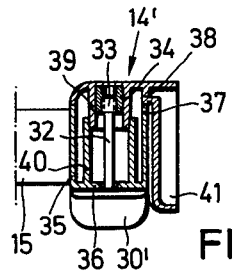
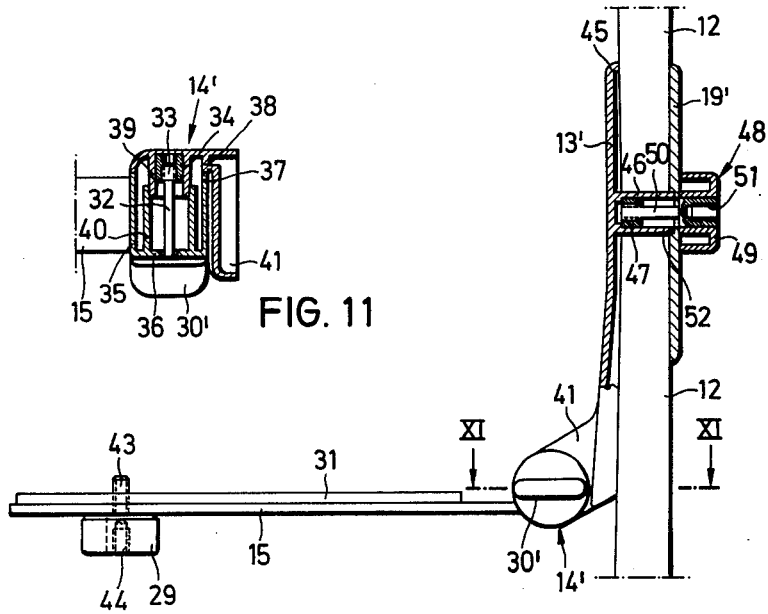
FIG. 11
FIG. 10

REFLECTOR ARRANGEMENT FOR PHOTO-TECHNICAL AND PHOTOGRAPHIC PURPOSE

BACKGROUND OF THE INVENTION

The invention relates to a reflector arrangement for photo-technical and photographic purposes comprising a reflector screen and a mounting supporting said screen.

For illuminating movie scenes for still pictures and for similar photo-technical or photographic purposes as well as for brightening, use is made of reflector arrangements which either consist of reflecting metal sheets or of parabolic and other reflecting screens. There have been known reflector screens which may be opened like an umbrella, the covering being provided with a reflecting coating. The advantage of such reflector devices is that they do not require much space when folded together so that they can be easily transported. However, it is disadvantageous that the reflector surface has to be flexible or foldable. If the reflector surface consists of a metal coating, break points and creases can be easily formed during the folding, because of the frame, thus causing damages of the coating. Large sized metallic mirrors used for brightening are unhandy and too heavy.

SUMMARY AND OBJECTS OF THE INVENTION

It is the object of the invention to provide a reflector arrangement of the type set forth at the outset hereof which can be dismantled without entailing damages of the reflector surface and which, subject to the invidiual requirements, can be used with reflector surfaces of different sizes.

To solve said problem, it is provided according to the invention that the mounting has a reflecting front plate which retains the reflector screen in connection with a support device fitted rearwardly.

In this connection, the front plate forms part of the mounting for the reflector screen being partly covered by it, and due to its reflecting front surface, it simultaneously replaces the covered portion of the reflector screen. Hence, the reflecting front plate of the mounting accomplishes a photo-technical (reflecting) and a mechanical (holding) function. Thus, the total reflecting surface is not reduced by the mounting.

It is highly advantageous that reflector screens of different sizes and shapes or one sole reflector screen only which consists of several parts, can be secured to the mounting. The reflector screen as it is, or the parts of which it is composed are rigid thus rendering the reflector screen self-supporting in the mounting, while, in disassembled condition, it forms a (plane or curved) plate.

The mounting with the reflecting plate may be also used without the additional reflector screen if only a relatively insignificant illumination is required, for which the light reflected by the front plate is available for the illumination. If more light is required, a rigid reflector screen can be mounted by clamping behind the plate which screen partly projects above the front plate of the mounting.

In case of a still higher demand of light, the reflector screen can be composed of several plate-shaped elements which can be clamped with one corner each between the front plate and the supporting device. The mounting with the front plate only form the central portion or the core of the total reflecting surface while the elements of the reflector screen extend to all sides far beyond the front plate of the mounting.

Such a reflector arrangement may be of multiple use, for example in connection with a light source or for reflecting light of foreign light sources or of daylight. The reflector arrangement consisting of different components may also be utilized by using its individual components in connection with different light sources or as fill-in lights.

In an advantageous embodiment of the invention, the front plate is connected to one arm of a clamping hinge the other arm of which is designed as a holding rail, to which a lamp can be secured, and which may be mounted at a tripod, thus resulting in a fixed (but adjustable) coordination between the mounting or its reflecting front plate and the lamp. Preferably, the clamping hinge is provided near one edge of the front plate so that the reflecting surface of the front plate can be fully radiated by a lamp which is secured to the holding rail.

In an advantageous embodiment of the invention, the support device is slidingly arranged on a pin projecting centrally from the rear side of the front plate, a clamping means preventing it from receding. The support device can be designed as a second plate which, as to shape and size nearly corresponds to the front plate. While the front plate should have a substantially plane reflecting front side and a plane rear side, the second plate only should include a plane front side engaging the reflector screen insertable between the plates, while the rear side of the second plate can be provided with reinforcing ribs or it can be profiled at will.

A mounting of a relatively small size can hold a reflector screen having a large reflecting surface. If it is made of one piece, it has to be provided with a passageway for the pin connecting the two plates of the mounting. However, if the reflector screen is formed of several parts whose corners meet in the region of the mounting, no particular passageways are required. Moreover, this variant is advantageous because the individual parts of the reflector screen are small and handy. If they are substantially congruent, they can be piled and packed together to form a small parcel. Preferably, the parts of the reflector screen can be assembled by joining their edges to form a closed surface, the edges of two abutting parts include intermeshing holding means. Said holding means may comprise a groove and a projecting edge, parts of a dovetail connection or parts of an alternating recess. It is important that the edges of the parts composed to form the reflector screen are in a positive engagement, to exclude any edge displacement between the elements at the reflection surface. In addition, the individual parts should be locked against each other radially to the pin of the mounting thus permitting to separate them again from each other only upon the dissociation of the rear support device.

To obtain a soft, shadow-free illumination, it is provided in an advantageous embodiment of the invention that at least the surface of the reflector screen consists of a granular or foamed plastic material. To save weight, it is additionally suitable for the reflector screen and its elements in total to be made of a granular or foamed plastic material. To this effect, polystyrene material having a volume weight of about 30 to 50 g/l (grams per liter) is particularly suited. Such a plastic is of a low weight, on the one hand, but it is also characterized by the required resistance. The front face of the reflector screen may be provided with a metal coating which may consist of a sheet or of a metal layer applied by evaporation. It is also possible to provide a reflector screen body of granular or foamed plastic to apply to it the metal coating.

BRIEF DESCRIPTION OF THE DRAWINGS

One embodiment of the invention will be explained more closely hereinafter with reference to the drawings.

FIG. 2 shows the reflector device comprising the small reflector screen,

FIG. 3 shows the reflector device according to FIG. 2 mounted on a tripod, and with a lamp, FIG. 4 shows the reflector device without the additional screen, only the reflecting front plate of the mounting being effective.

FIG. 5 shows the components of the reflector device when folded together.

FIG. 6 shows a sectional view of the mounting including the holding rail,

FIG. 7 shows a view of FIG. 6 in direction of arrow VII,

FIG. 10 shows a view of a second embodiment of the mounting partly sectional, and FIG. 11 shows a section along line XI—XI of FIG. 10.

DETAILED DESCRIPTION OF THE INVENTION

Figure 1:
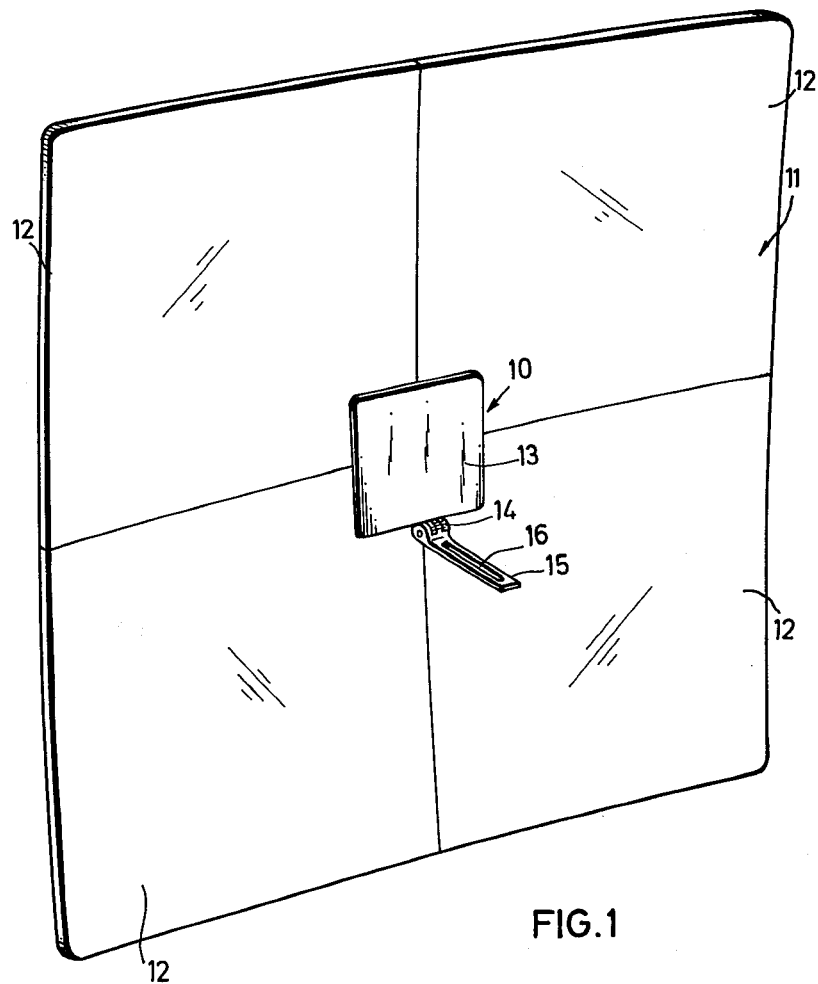
FIG. 1 shows the reflector device comprising the large reflector screen.

The reflector assembly mounted with full reflector surface according to FIG. 1 consists of the mounting 10 and of the reflector screen 11 composed of four equal elements 12. The plate-shaped elements 12 are square-shaped to form a square-shaped reflector screen 11 comprising a mounting 10 in its center. The front sides of the plate-shaped elements 13 together with the reflecting surface of the front plate 13 of the mounting 10 form the reflection surface.

The front plate 13 of the mounting 10 forms the one arm of a clamping hinge 14 whose second metallic arm 15 can be swivelled. The clamping hinge 14 is fitted along the lower edge of the front plate 13. The metallic holding rail 15 has an elongated slot to pass therethrough a clamping pin of a tripod 17 (FIG. 3). By this means, the holding rail 15 can be mounted horizontally on a tripod 17, and it is possible additionally to mount at the holding rail 15 a lamp 18 at a distance from the reflecting surface.

In the variant illustrated in FIGS. 2 and 3, only one of the plate-shaped elements 12 is clamped between the front plate and the rearward second plate 19 of the mounting 10, the lower edge of the element 12 extending approximately along the horizontal center line of the plates 13 and 19, while the plate 12 projects far beyond the plates 13 and 19 to the top and to the sides. While the front surface of the element 12 is partly covered by the front plate 13, the effective reflecting surface in total is larger than the front surface of element 12 because the front surface of plate 13 is also reflective.

From the rear side of the front plate 13 of the mounting 10 a hollow cylindrical pin 21 fitted exactly in the center of the plate 13 extends rectangularly to the rear. The rear plate 19 with its central aperture is slipped over the pin 21. The rear end of the pin 21 projecting beyond the plate 19 is provided with a thread on which a bushing 22 is screwed that is fitted with outer grip grooves. As obvious from FIG. 6, the plate-shaped elements 12 of the reflector screen are clamped between the plates 13 and 19, it being possible to determine the clamping force by tightening the thread bushing 22.

FIG. 7 shows a clamping joint 14 comprising a screw 30 by which the intermeshing disks of plate 13 and of the holding rail 15 can be pressed against each other. The holding rail 15 is provided with a rubber seat and with a fixing screw 32 projecting through the elongated slot 16.

Figure 8:
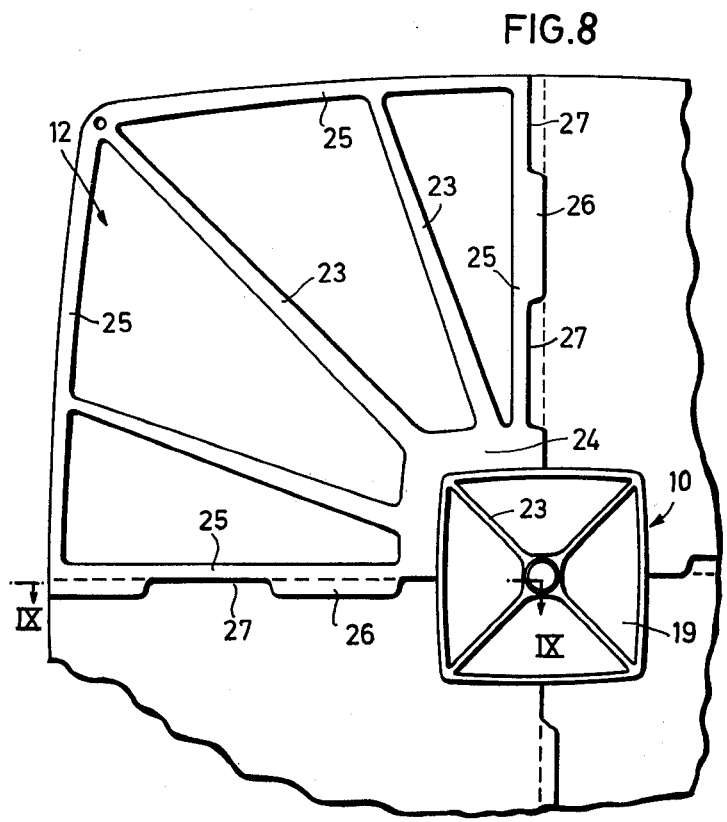
FIG. 8 shows a partial view of the reflector device according to FIG. 1 from the rear side.

FIG. 8 shows the rear view of the plate shaped elements 12 and of the mounting 10. The plate-shaped elements 12 are thicker in the region 24 of one corner in which region they are clamped between the plates 13 and 19, the same applies to the edges 25 which are also thicker. From the corner region 24, struts 23 which are also thicker, extend radially to the edges 25 while the walls of the panels extending between the ribs 23,24,25 are relatively thin.

Figure 9:
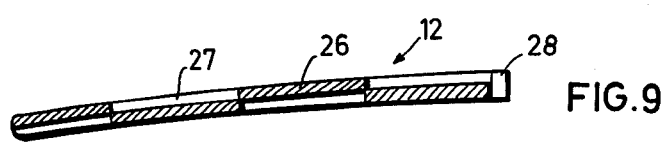
FIG. 9 shows a section along line IX—IX of FIG. 8.

The shape of the edges of the plate-shaped elements 12 is illustrated in FIGS. 8 and 9. While the two edges forming the limitation of the completely assembled reflector screen 11 are smooth, the edges at which the element 12 joins the corresponding adjacent element 12 are provided alternatingly with tongs 26 and recesses 27, which, with two abutting edges, are complementary relative to each other so that the elements 12 fitted to meet with their edges, are hooked into one another. The tongs 26 and the recesses 27 form an alternating recess preventing the elements 12 from being unintentionally displaced against each other.

In the area of the corner abutting against the pin 21 each plate 24 is provided with a quadrantal recess (28) FIG. 9) to permit a jointless abutment of the elements 12 in one plane.

The material of the plate-shaped elements 12 is made of polystyrene (Styropor) having a volume weight of about 30 to 50 g/l. Its resistance is sufficient and its weight is low. The granular structure of the surface of the plate-shaped elements 12 is indicated in FIG. 7 at 33. The granular structure causes a diffusing light reflection so that a soft and shadow-free illumination is realized. The front plate 13 of the mounting 10 also consists of polystyrene, which is not granular or foamed, but which is solid. The rear plate 19 may be made of the same material.

In dismantled condition (FIG. 5) the reflector arrangement comprises the piled plate-shaped elements 12 and the mounting 10, the plates 13 and 19 being placed against each other and the holding rail 15 being folded against the front side of the plate 13.

The embodiment of the mounting shown in FIGS. 10 and 11 is more or less similar to the embodiment already disclosed above. The corresponding components are marked with a prime (').

The clamping hinge 14' connecting according to FIG. 10 the holding rail 15 to an extension 41 projecting from the lower end of the front plate 13 contains a rotary knob 30' provided with a shaft 32, whose front end comprises a threaded portion 33 engaging a metallic threaded bushing 34 secured to the extension 41, the shaft 32 extending through a sleeve 35 firmly connected to the end of the holding rail 15. When tightened, the rotary knob 30' presses against the end wall 36 of the sleeve 35 thus pressing firmly against an annular wall 38 of the extension 41 the annular end 37 averted from the end wall 36. The annular wall 38 coaxially surrounds a cylinder 39 which firmly encloses the threaded portion 34. The outside of the cylinder 39 serves as a guide for a cylindrical bushing 40 connected to the end wall 36.

The threaded shaft 43 of the fixing screw 29 is passed through the longitudinal slot of the holding rail 15 and of the rubber seat 31 to permit fastening of a flashlamp on the free end of the threaded shaft 43. The knob of the fixing screw 29 is provided with an internal thread 44 into which the threaded shaft of a stand can be screwed.

In the embodiment of FIG. 10, the front plate 13' is surrounded by a border 45 extending rearwardly and applied to the front side of the plate-shaped element 12. Therefore, plate 13' does not flatly rest against the elements 12.

From the center of the front plate 13', a cylindrical sleeve 46 housing a nut 47 is clamped in it projects to the rear. The length of the sleeve 46 is somewhat superior to the width of elements 12 thus causing the sleeve 47 to slightly protrude. At the rear end of the sleeve 46, the rear plate 19' is mounted which contains a corresponding opening with an annular stepped recess 52. Fixing is achieved by means of a bolt 48 comprising a rotary knob 49 supported at the rear side of plate 19' and a shaft 50 projecting into the sleeve 46. At the front end of the shaft 50, there is a threaded portion to be screwed into the nut 47. By turning knob 49, the elements 12 are clamped between the plates 13' and 19'. An excessive pressure of elements 12 is avoided by the stepped recess 52 keeping positively spaced apart at a specific minimum the two plates 13' and 19'.

A thread bore 51 in the rotary knob permits to introduce by screwing a threaded pin of another (non-illustrated) auxiliary device or a tripod.

What is claimed is:

1. A reflector arrangement for photo-technical and photographic purposes comprising:
   a reflector screen; and
   a mounting device for supporting said reflector screen;
   said mounting device including a reflecting front plate for retaining the reflector screen in combination with a rearwardly provided supporting device;
   said front plate forming one arm of a clamping hinge, said clamping hinge including a second arm designed as a holding rail;
   said reflector screen including several plate-shaped elements each clamped at one corner between the front plate and the supporting device.

2. A reflector arrangement according to claim 1, wherein the clamping hinge is fitted near one edge of the front plate.

3. A reflector arrangement according to claim 1, wherein the supporting device is provided on a pin projecting centrally from the rear side of the front plate and is prevented from receding by a clamping means.

4. A reflector arrangement according to claim 1, wherein the supporting device is a second plate which, as to shape and size, nearly corresponds to the front plate.

5. A reflector arrangement according to claim 1, wherein the several plate-shaped elements of the reflector screen can be placed against each other with their edges to form one closed surface and the edges of two abutting elements include intermeshing retention means.

6. A reflector arrangement according to claim 5, wherein at least the front surface of the reflector screen consists of a granular or foamed plastic material.

7. A reflector arrangement according to claim 6, wherein the reflector screen or its several plate-shaped elements consist in total of a granular of foamed plastic material.

8. A reflector arrangement according to claim 1, wherein the front surface of the reflector screen is provided with a metallic coating.

9. A reflector arrangement according to claim 1, wherein the front plate of the mounting is made of the same basic material as the reflector screen.

* * * * *